United States Patent

Winne

[15] 3,682,327
[45] Aug. 8, 1972

[54] ROTARY WORK-HANDLING ATTACHMENT FOR WORK TRANSFER DEVICE

[72] Inventor: John R. Winne, Detroit, Mich.
[73] Assignee: Erie Engineering Company, Troy, Mich.
[22] Filed: April 3, 1970
[21] Appl. No.: 25,518

[52] U.S. Cl. .................................. 214/1 BC, 214/1 Q
[51] Int. Cl. ............................................. B66c 1/44
[58] Field of Search ........... 214/1 B, 1 BC, 1 BD, 1 Q

[56] References Cited

UNITED STATES PATENTS

| | | | |
|---|---|---|---|
| 3,047,164 | 7/1962 | Meckstroth | 214/1 BC |
| 3,306,471 | 2/1967 | Devol | 214/1 BC |
| 3,348,298 | 10/1967 | Sedgwick | 214/1 BD |
| 3,572,519 | 3/1971 | Tezuka | 214/1 BC |

*Primary Examiner*—Gerald M. Forlenza
*Assistant Examiner*—George F. Abraham
*Attorney*—Barthel & Bugbee

[57] ABSTRACT

The present invention replaces the workpiece-lifting arm on top of the vertically-reciprocating horizontally-turning lift piston rod of the Lifting and Swinging Work Transfer Device of Kirsch et al. U.S. Pat. No. 3,406,837 of Oct. 22, 1968 by a head adjustably holding a horizontal slide bearing sleeve in which is adjustably slidably mounted an elongated tubular arm. The forward end of this arm carries a stationary work-gripping jaw disposed adjacent a movable work-gripping jaw on a piston rod extending through the arm to the piston head of a jaw-operating fluid pressure cylinder mounted on the rearward end of the arm. Drivingly secured to the arm is an arm-rotating pinion which meshes with a toothed rack interconnecting the spaced two heads of a double-headed piston. The piston is reciprocable in a stationary cylinder mounted on the bearing sleeve. The stroke of the piston at one end of the cylinder is limited by an adjustable stop adjacent an adjustable cylinder head while at the other end the stroke is limited by interchangeable stops adjacent a removable cylinder head for limiting the maximum stroke of the piston and therefore limiting the amount of rotation imparted to the tubular arm and work-gripping jaws carried thereby.

1 Claim, 3 Drawing Figures

PATENTED AUG 8 1972
3,682,327
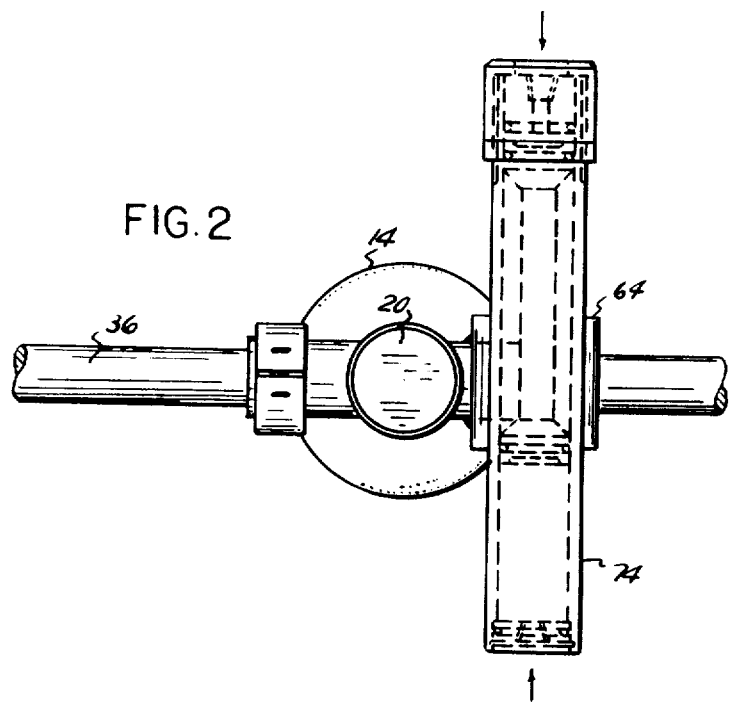
FIG. 2
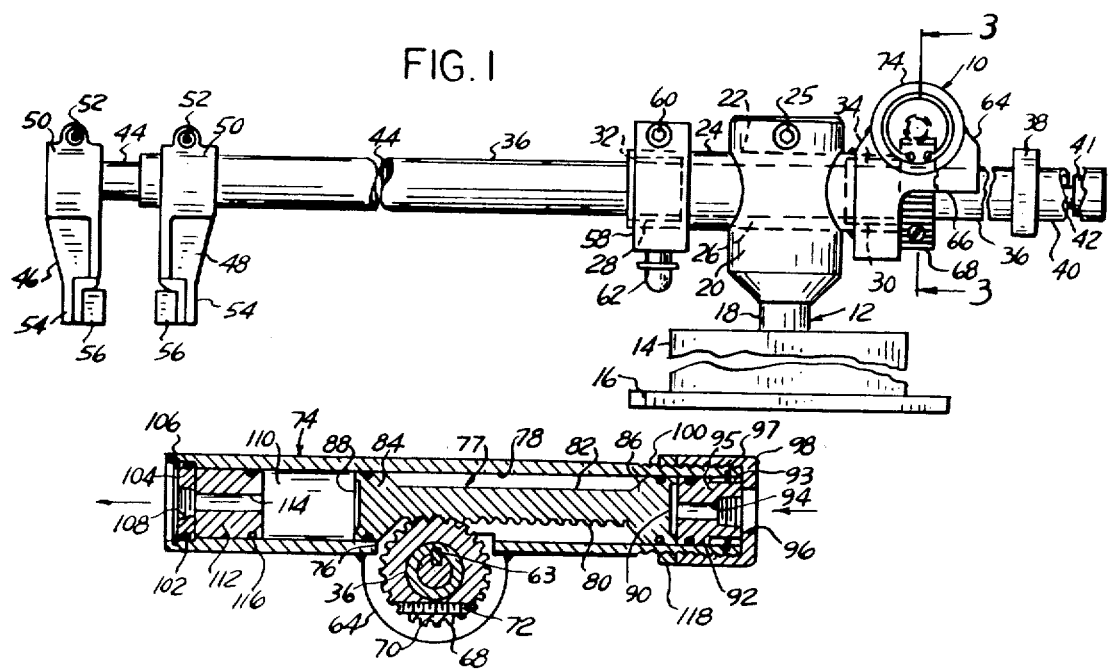
FIG. 1
FIG. 3
INVENTOR
JOHN R WINNE
BY Barthel & Bugbee
ATTORNEYS 3,682,327

ROTARY WORK-HANDLING ATTACHMENT FOR WORK TRANSFER DEVICE

In the drawings,

FIG. 1 is a side elevation of a rotary work-handling attachment for a work transfer device, according to one form of the invention, with the work-gripping jaws in their retracted positions;

FIG. 2 is a fragmentary top plan view of the attachment shown in FIG. 1; and

FIG. 3 is a vertical cross-section taken along the line 3—3 in FIG. 2.

Referring to the drawing in detail, FIGS. 1 and 2 show a rotary work-handling attachment, generally designated 10, for the work transfer device, generally designated 12 shown in detail in the Kirsch and Robb U.S. Pat. No. 3,406,837 issued Oct. 22, 1968 for Lifting and Swinging Work Transfer Device. The latter device is operated pneumatically and has a cylinder 14 mounted on a base 16 which is bolted or otherwise secured to the stamping press or other machine (not shown) served by the device 12. For the purposes of the present invention, it is believed sufficient to state that the device 12 has a piston rod 18 projecting upward from the top thereof which is capable both of rotation through a partial revolution and reciprocation vertically so as to rise and fall as well as swing horizontally in response to the operation of pneumatically-actuated mechanism contained within the cylinder 14. This actuates the piston rod 18 to automatically swing a workgripping arm into position over a workpiece, to descend into gripping engagement with the workpiece, to ascend while lifting the workpiece, to swing horizontally to a predetermined location, and there to descend and release the workpiece, all as described and shown in the said U.S. Pat. No. 3,406,837.

The rotary work-handling attachment 10 is provided with a split adapter head or arm holder 20 which is bored at its lower end to receive the upper end of the piston rod 18 whereby it replaces the work-gripping arm in the device of the said U.S. Pat. No. 3,406,837. The head 20 near its upper end is provided with a radial or transverse bore 22 which adjustably receives an elongated tubular arm sleeve bearing 24 clamped in position by a clamping screw 25. The sleeve bearing 24 contains a longitudinal bearing bore 26 with counterbores 28 and 30 in the forward and rearward ends thereof. Secured within the counterbores 28 and 30 are bearing bushings 32 and 34 which slidably receive an elongated tubular arm 36 which is slidably mounted in the bearing bushings 32 and 34.

Mounted on the rearward end of the tubular arm 36 is the head 38 of a double-acting work-gripping jaw-actuating pneumatic cylinder 40 in which is reciprocably mounted a piston head 41 connected to a piston rod 42 which in turn is threaded into the rearward end of a tubular piston rod extension 44. The piston rod extension 44 projects forward through the entire length of the elongated tubular arm 36 and emerges from the forward end thereof to receive a movable work-gripping jaw 46, opposite which an oppositely-facing fixed jaw 48 is fixedly mounted on the forward end of the arm 36. The heads 50 of the jaws 46 and 48 are split to receive clamping screws 52. The opposite ends 54 of the jaws 46 and 48 are tapered and each has secured thereto a work-gripping insert 56.

Mounted on and secured to the elongated tubular bearing sleeve 24 forward of the head 20 is a split collar 58 clamped thereto by a clamping screw 60. Secured in and extending radially downward from the collar 58 is a rounded-end position-locating dowel 62. In order to prevent relative rotation between the arm 36 and the piston rod extension 44 yet permit relative reciprocation therebetween, these are grooved or slotted longitudinally to respectively receive a rotation-preventing key or pin 63 (FIG. 3).

Welded or otherwise fixedly secured to the sleeve bearing 24 at its rearward end is a mounting block or bracket 64, the lower rearward portion 66 of which is cut away (FIG. 1) to expose a pinion 68 which is split radially at 70 and is provided with a chordal clamping screw 72 by which the pinion 68 is securely clamped to the elongated tubular arm 36. Welded or otherwise fixedly secured to the upper side of the mounting block or bracket 64 is a fluid pressure cylinder 74, preferably a pneumatic cylinder having on its lower side an elongated opening 76 through which the pinion 68 projects upward into the bore 78 of the cylinder 74, which slidably receives a double-headed piston 77. The pinion 68 meshes with the toothed rack portion 80 of the piston rod 82 which has forward and rearward piston heads 84 and 86 with forward and rearward ends 88 and 90.

The rearward end of the cylinder bore 78 receives a tubular rearward stop member 92 having a partly-threaded fluid passageway 94 therethrough communicating with an access opening 96 in the rearward outer end of an internally-threaded cup-shaped rotatable cylinder head 98 which is threaded upon the correspondingly-threaded rearward end portion 100 of the cylinder 74. The cylinder head 98 is thus rotatably and adjustably mounted on the cylinder 74 to precisely position the rearward stop member 92 at a location where it will halt the double-headed piston 77 at a predetermined position at the rearward end of its stroke. The rearward stop member 92 has a reduced-diameter rearward portion 93 providing an annular stop shoulder 95 adapted to engage a snap ring 97 fitted into the internally-grooved bore 78 so as to prevent accidental expulsion of the stop member 92 by air pressure when the cylinder head 98 is removed. The forward end of the cylinder bore 78 is counterbored at 102 (FIG. 3) to receive a forward cylinder head or plug 104 and is grooved to receive a snap ring 106 at the outer end of the forward cylinder head 104 to hold the latter in place. The forward cylinder head 104 is provided with a threaded forward fluid port 108. A forward stop chamber 110 is provided at the forward end of the cylinder bore 78 for optionally slidably receiving one or more additional forward stop members 112 similar to the stop members 92 for precisely limiting the forward stroke of the double-headed piston 77 and similarly provided with a fluid passageway 114 therethrough. The stop members 92 and 112 and the cylinder heads 92 and 104, as well as the piston heads 84 and 86 are annularly grooved to receive sealing members 116, such as conventional O-rings, for preventing leakage therepast. An annular internally-threaded lock nut 118 is threaded upon the rearward end of the cylinder 74 adjacent the rearward cylinder head or adjusting knob 98 for locking the latter in its adjusted position.

In the operation of the rotary work-handling attachment 10, it will be assumed that the jaw-operating cylinder 40 is provided at its opposite ends with fluid ports and that the threaded rearward and forward ports 95 and 108 of the cylinder 74 are connected by suitable conventional hoses to control valves for admission of pressure fluid, such as compressed air, to one end of the cylinder 40 or 74 while discharging fluid from the opposite end thereof. Let it also be assumed that the various working parts are in their retracted positions shown in FIG. 1 and that it is desired to rotate the tubular arm 36 while it is being swung to transfer a workpiece (not shown) in the jaws 46 and 48 between its work pickup and work discharge positions.

To remove a workpiece, for example, from a typical machine, such as a forming press, and transfer it to a place of disposal and deposit it thereat, the control valve for the cylinder 14 is caused to admit compressed air to the lower end thereof to move the piston rod 18 thereof upward, carrying with it the rotary work-handling attachment 10 connected thereto by the head 20 on the piston rod 18. Thereupon the admission of compressed air to the pneumatically-actuated mechanism within the cylinder 14 causes the piston rod 18 thereof to rotate, swinging the head 20 and the rotary work-handling attachment 10 carried thereby through an arcuate horizontal path into a workpiece pick-up position above the workpiece in the machine. The control valve for the work-gripping jaw-actuating cylinder 40 is now operated to admit pressure fluid to the rearward end of the cylinder 40 and discharge fluid from the forward end thereof, thereby causing the piston rod 42 and its extension 44 to move forward to the left in FIG. 1, causing the movable jaw 46 to move leftward away from the fixed jaw 48 into a position adapted to receive the workpiece to be transferred.

The control valve for the cylinder 14 is now operated to admit pressure fluid to the upper end thereof and release it from the lower end thereof so as to cause the piston rod 18 and the rotary work-handling attachment 10 to move downward bodily, carrying the work-gripping jaws 46 and 48 downward into positions on opposite sides of the workpiece to be transferred. The workpiece jaw-actuating cylinder 40 is then provided with pressure fluid at its forward end and caused to discharge fluid at its rearward end, thereby causing the piston rod 42 and piston rod extension 44 to move rearwardly to the right in FIG. 1, thereby causing the movable jaw 46 to move toward the fixed jaw 48 and thereby firmly grasp the workpiece therebetween.

The control valve for the cylinder 14 is then operated to admit pressure fluid to the lower end thereof and discharge fluid from the upper end thereof, thereby causing the rotary work-handling attachment 10 to rise while its work-gripping jaws 46 and 48 lift the workpiece out of the machine being served. The pneumatically-actuated mechanism within the cylinder 14 is now caused to rotate the piston rod 18 thereof through the desired angle so as to swing the attachment 10 horizontally to a location near the location for disposal of the workpiece. At the same time, pressure fluid is supplied to the rearward end port 95 and caused to be discharged from the forward end port 108 thereof by actuating the control valve for the rotary work-handling attachment 10, thereby causing the double-headed piston 77 to move forward to the left in FIG. 3, whereby its toothed rack portion 80 rotates the pinion 68 counterclockwise, correspondingly rotating the tubular arm 36, piston rod extension 44 and the jaws 46 and 48 with the workpiece held between them. The double-headed piston 77 halts when its forward end 88 encounters the forward stop member 112.

The control valve for the jaw-actuating cylinder 40 is then operated to admit pressure fluid to the rearward end thereof and to discharge fluid from the forward end thereof, thereby causing the piston head 41, piston rod 42, piston rod extension 44 and movable jaw 46 to move forward to the left in FIG. 1, releasing the grip of the jaws 46 and 48 upon the workpiece and causing it to drop into a place of disposal such as a tote box, onto a moving conveyor, into a chute or other place of disposal. The control valve for the pneumatic mechanism within the cylinder 14 is then operated to cause the piston rod 18 thereof to rotate in a reverse direction so as to swing the tubular arm 36 through its arcuate horizontal return path back to the machine being served. The operation of picking up and transferring the next workpiece is then repeated in the manner described above.

I claim:

1. A rotary work-handling attachment for the vertically-reciprocating horizontally-rotating lift piston rod of a lifting and swinging work transfer device, said attachment comprising
   an arm holder adapted to fit onto the lift piston rod in place of the existing work transfer mechanism already thereon,
   an elongated tubular arm bearing structure with axially-spaced bearings therein mounted on said arm holder,
   an elongated horizontal arm rotatably mounted on said arm bearing structure for rotation around the longitudinal axis of said arm bearing structure,
   a fluid pressure jaw-operating cylinder mounted on said arm and having a jaw-operating piston reciprocable therein,
   a first work-gripping jaw mounted on said arm remote from said jaw-operating cylinder,
   a second work-gripping jaw mounted adjacent said first work-gripping jaw for motion relatively thereto,
   a jaw-operating motion-transmitting member operatively connecting said jaw-operating piston to at least one of said jaws,
   a bracket member mounted on said arm bearing structure,
   a fluid pressure arm-rotating cylinder mounted on said bracket member with its axis disposed transversely to said arm and having an arm-rotating piston reciprocable therein,
      said arm-rotating piston having a piston rod with rack teeth therealong and having two piston heads spaced axially apart from one another on said piston rod, and a pinion operatively connected to said arm and disposed between said piston heads and meshing with said rack teeth on said piston rod,
      said arm-rotating cylinder having a first cylinder head removably mounted on one end thereof and a first piston-stroke-limiting stop member removably mounted in said arm-rotating cylinder adjacent said first removable cylinder head, said arm-rotating cylinder having a second stroke-adjusting cylinder head threadedly mounted on the other end thereof for adjustment longitudinally therealong, and a second piston-stroke-limiting stop member interchangeably and removably mounted in said arm-rotating cylinder adjacent said second cylinder head, and means on said cylinders for respectively supplying and discharging pressure fluid to and from said cylinders.

* * * * *